United States Patent [19]

Welcher et al.

[11] 4,092,467
[45] May 30, 1978

[54] CONTROLLED POLYMERIZATION OF DIMETHYLDIALLYLAMMONIUM HALIDES BY THE USE OF ALKALI METAL OR AMMONIUM BISULFITES OR METABISULFITES

[75] Inventors: Richard P. Welcher, Old Greenwich; Robert Rabinowitz; Algird S. Cibulskas, both of Stamford, all of Conn.

[73] Assignee: American Cyanamid Company, Stamford, Conn.

[21] Appl. No.: 767,091

[22] Filed: Feb. 9, 1977

[51] Int. Cl.² ............................ C08F 2/10; C08F 4/40
[52] U.S. Cl. ....................................... 526/80; 526/81; 526/229; 526/292
[58] Field of Search .................... 526/80, 81, 292, 229

[56] References Cited

U.S. PATENT DOCUMENTS

| 2,923,701 | 2/1960 | Schuller et al. | 526/292 |
| 3,412,019 | 11/1968 | Hoover et al. | 526/292 |
| 3,862,091 | 1/1975 | Barabas et al. | 526/292 |

*Primary Examiner*—Herbert J. Lilling
*Attorney, Agent, or Firm*—William J. van Loo

[57] ABSTRACT

An alkali metal or ammonium bisulfite or metabisulfite added incrementally to a polymerizing aqueous solution of dimethyldiallylammonium halide enables control of the intrinsic viscosity of the resulting polymer within desired limits without adverse effect on monomer conversion.

9 Claims, No Drawings

CONTROLLED POLYMERIZATION OF DIMETHYLDIALLYLAMMONIUM HALIDES BY THE USE OF ALKALI METAL OR AMMONIUM BISULFITES OR METABISULFITES

This invention relates to an improved process for preparing a dimethyldiallylammonium halide polymer. More particularly, this invention relates to such a process wherein the polymers are obtained in a greater range of intrinsic viscosities at low unreacted monomer contents over a wider range of initial monomer concentration.

The polymerization of dimethyldiallylammonium halides was first reported in 1951. These monomers were found to be unusual in polymerization reactions. In spite of the fact that they contained allyl groups, they nevertheless showed high reactivity in polymerization reactions. Further, in spite of the fact that the monomers contained two allyl groups, they provided linear water-soluble polymers. These unusual monomer properties led to studies that confirmed that in polymer formation, the two allyl groups interacted to provide a ring structure which led to linear chain propagation. Early studies suggested that the ring structure comprised piperidine linkages but recent published studies indicate that the ring structure comprises a five--membered pyrrolidinium structure. [J. E. Lancaster, et al., J. Polym. Sci. Polym. Letters Ed. 14, 549 (1976)].

The prior art has taught that there are only limited ranges of monomer concentrations that can be used to prepare polymers while avoiding excesses of unreacted monomer. It has also taught that polymers of low intrinsic viscosity can only be obtained with excessive amounts of unreacted monomers. Further, the prior art has taught that conditions of high monomer concentrations lead only to polymers of the highest intrinsic viscosity, a situation which limits processing.

Specifically, the prior art [J. E. Boothe et al., J. Macromol. Sci. Chem., A4(6), P 1419-1430, Oct. 1970] taught that product viscosity increased as the initial monomer concentration rose to 60 weight percent, then increased sharply to a maximum at 66-68 weight percent monomer concentration, and rapidly decreased as monomer concentration rose above 68 weight percent. As the usage of ammonium persulfate catalyst increased up to about 0.7 weight percent based on the monomer content, product viscosity also increased but then declined above 0.7 weight percent. At or above the 0.7 weight percent persulfate catalyst usage, unreacted monomer content in the product was at a minimum. However, initial monomer concentration also influenced unreacted monomer content, the minimum residual monomer being obtained at 55-65 weight percent monomer concentration.

The literature also teaches that certain additives can be used to control the viscosity of a polymer. Organic additives often employed include isopropyl alcohol, thioglycolic acid, dodecyl mercaptan and carbon tetrachloride. Such additives would be undesirable in the polymerization of dimethylallyl ammonium halides since the polymer is used in water treatment. The additives would be unsuitable from an environmental viewpoint and their removal would be difficult and costly. The use of such additives results in an increase in unreacted monomer.

Accordingly, there exists at the present time the need for an improved process for the preparation of dimethyldiallylammonium halide polymers that would overcome the above deficiencies of the prior art processes and lead to polymers of a greater range of intrinsic viscosities at wider initial monomer concentrations while maintaining low unreacted monomer contents in the final product.

In accordance with the present invention, there is provided a process for preparing polymers of dimethyldiallylammonium halides while maintaining low unreacted monomer content therein which comprises preparing an aqueous solution containing from about 40 to 70 weight percent of said monomer, effecting polymerization at elevated temperature by incremental addition of an effective amount of a compatible free radical catalyst, and controlling said polymerization to provide a polymer having an intrinsic viscosity in the range of about 0.1 to 1.45 deciliters per gram by the incremental addition of from about 0.01 to 10.0 weight percent of an alkali metal or an ammonium bisulfite, based on the weight of monomer, during the course of said polymerization.

The process of the present invention provides polymer product with close reproducible control of the intrinsic viscosity thereof at desired values while maintaining low reacted monomer content therein. Unexpectedly, the present process, by control of the polymerization reaction with suitable bisulfite salt, enables:

1. low viscosity products to be obtained despite high initial monomer concentrations;
2. low residual monomer contents at low catalyst usage at either high or low initial monomer concentrations;
3. low residual monomer content at low polymer viscosity;
4. control of the residual monomer content to be effected by the usage of bisulfite salt rather than monomer concentration or catalyst usage;
5. higher catalyst usages to be employed without lowering the product viscosity; and
6. reproducible high or low viscosity products to be obtained from monomer batches of differing quality.

The process of the present invention offers the additional advantage of enabling the desired polymer intrinsic viscosity to be obtained while maintaining high conversion at low monomer concentrations that provide polymer solutions having moderate solution viscosity to facilitate processing. In addition, since the process of the present invention controls the polymerization reaction by use of bisulfite salts, it is less sensitive to variations that may arise in raw material supplies, impurities, rates of catalyst addition, etc.

In carrying out the process of the present invention, the monomer to be polymerized is a dimethyldiallylammonium halide such as the fluoride, chloride, bromide, and iodide quaternaries, with the chloride being preferred for reasons of commercial availability and economic advantages.

The skilled artisan will readily recognize that dialkyldiallylammonium halides other than dimethyldiallyl ammonium chloride would be susceptible to polymerization control by use of a metabisulfite or bisulfite. Such artisan will also appreciate the fact that other monomers polymerizable with a free radical catalyst can replace some of the dialkyldiallylammonium halide monomer while still providing a reaction system capable of being controlled by a metabisulfite or bisulfite to show the same advantages of selective viscosity while maintaining a low residual monomer concentration.

Once the desired monomer is selected, it is prepared as an aqueous solution containing from about 40 to 70 preferably 45 to 65 weight percent of the selected monomer.

The particular monomer concentration selected will be determined to some extent by the intrinsic viscosity desired for the resulting polymer. Polymers of low intrinsic viscosity may be prepared over the entire range of monomer concentrations while polymers of high intrinsic viscosity are generally prepared at the upper half of the range of monomer concentrations.

After the monomer solution is prepared, in a preferred embodiment it is next purged of oxygen in accordance with conventional procedures. Usually, this is done using nitrogen. However, it is not necessary to purge to effect reaction, but a more desirable product is obtained when purging is used.

After the monomer solution is purged, it is ready for polymerization to be effected. To do this, it is necessary to add an effective amount of a compatible free radical catalyst in increments over a suitable time period in accordance with conventional procedures. Compatible free radical catalysts are those which do not react with the monomer in a manner which reduces their ability to promote polymerization. The amount of catalyst to be used and the rate of addition thereof will generally be in conformity with prior art procedures. As noted above, the process of the present invention, by its provision for polymerization control, enables greater fluctuations with respect to catalyst usage and addition rate to be tolerated without adverse effect on intrinsic viscosity of the polymer or unreacted monomer content.

The polymerization reaction is an exothermic reaction in the earlier stages and advantage is taken of this exotherm to provide an elevated temperature for the reaction. Thus, catalyst addition and the removal of heat should be at a rate sufficient to provide the desired polymerization temperature, which preferably is at or near the reflux temperature of the reacting solution. Cooling may be required in the initial stages if the exotherm is too great and external heating may be required in the late stages when the exotherm subsides. After all of the catalyst has been added, reaction is continued at the elevated temperature employed for a sufficient time to complete polymerization, generally about 30 additional minutes.

Concurrent with the incremental addition of catalyst, the process of the present invention requires incremental addition of an alkali metal or ammonium bisulfite to the reacting solution to control polymerization. The amount of bisulfite to be added will depend upon a number of factors; the amount of catalyst employed, the particular value of intrinsic viscosity desired, and the initial concentration of monomer in the polymerization solution. The amount of bisulfite will vary for different preparations but will fall in the range of about 0.01 to 10.0 weight percent based on the weight of monomer present. Specific amounts for a particular preparation can be determined by a trial run and the amounts necessary for other preparations can then be calculated from the trial run. Particular preparations are given herein in the examples and can be used as guides. In general, larger amounts of bisulfite are needed to prepare polymers of low intrinsic viscosity and smaller amounts are needed in preparing polymers of high intrinsic viscosity. Useful bisulfites include sodium, potassium and ammonium bisulfite, or the corresponding metabisulfites.

After all of the catalyst and bisulfite are added, the reaction is continued for an additional time period, usually about 30 minutes to ensure complete reaction. The reaction mixture is then cooled to ambient conditions. It is generally desirable to adjust the pH of the polymer solution to a value in the range of 3–9 for safety in handling, if necessary. Dilution may also be effected if desired.

The invention is illustrated by the examples which follow wherein all parts and percentages are by weight unless otherwise specified.

EXAMPLES 1–5

A series of polymerizations were carried out using diallyldimethylammonium chloride monomer as a 63% solution in water. The catalyst employed was ammonium persulfate and sodium metabisulfite was used to control the polymerization. Before initiating polymerization, the monomer solution and the catalyst solutions were sparged with an inert gas to remove dissolved oxygen, according to conventional procedures. Nitrogen was satisfactory for this purpose. Also, a slow stream of inert gas was provided through the vapor space of the reaction vessel throughout the catalyst addition, to prevent the ingress of oxygen. Polymerization was conducted at the reflux temperature of the monomer solution (105°–115° C.). The catalyst and metabisulfite were added incrementally as dilute aqueous solutions, the catalyst being added over a six hour period and the metabisulfite over the first three hours of this six hour period. The reaction was continued for 30 minutes following completion of the catalyst addition. The amounts of catalyst and metabisulfite are given in Table I which also gives the intrinsic viscosity of the polymer obtained and the content of unreacted monomer.

The data given in Table I shows how sodium metabisulfite is effective in controlling intrinsic viscosity of the polymer ever at high monomer concentration while providing low residual monomer content even at low polymer viscosity and even at persulfate catalyst usages below 0.7 percent.

TABLE I

EFFECT OF SMBS ON POLYMERIZATION OF DADMC[1]

| Example No. | APS[2] Usage | SMBS[3] Usage | DADMC Conversion (%) | Intrinsic Viscosity (DL/G) |
|---|---|---|---|---|
| Comparative | 1.0 | 0.0 | 98 | 3.28 |
| 1 | 1.0 | 10.0 | 99 | 0.10 |
| 2 | 1.0 | 1.0 | 97 | 0.86 |
| 3 | 1.0 | 0.2 | 95 | 1.68 |
| 4 | 0.5 | 2.2 | 99 | 0.64 |
| 5 | 0.5 | 0.15 | 96 | 1.68 |

NOTES:
[1]63% Aqueous Solution
[2]Ammonium Persulfate, Weight Percent Based on Monomer weight
[3]Sodium Metabisulfite, Weight Percent Based on Monomer weight

EXAMPLES 6–9

The procedure of Examples 1–5 was repeated except that the monomer solution contained 52% DADMC. Results are given in Table II.

The results in Table II again show how intrinsic viscosity is controlled by sodium metabisulfite without an increase in residual monomer content at lower polymer viscosities.

TABLE II
EFFECT OF SMBS ON POLYMERIZATION OF DADMC[1]

| Example No. | APS[2] Usage | SMBS[3] Usage | DADMC Conversion (%) | Intrinsic Viscosity (DL/G) |
|---|---|---|---|---|
| 6 | 0.5 | 1.1 | 96 | 0.50 |
| 7 | 1.0 | 0.2 | 97 | 1.18 |
| 9 | 0.5 | 0.15 | 92 | 1.06 |

NOTES:
[1] 52% Aqueous Solution
[2] See Table I
[3] See Table I

EXAMPLES 10–13

The procedure of Examples 1–5 was again repeated except that the monomer solution contained 49% DADMC. Results are given in Table III.

The results given in Table III again show the effectiveness of sodium metabisulfate in controlling intrinsic viscosity without an increase in residual monomer content at a lower monomer concentration, or a catalyst usage below 0.7 percent.

TABLE III
EFFECT OF SMBS ON POLYMERIZATION OF DADMC[1]

| Example No. | APS[2] Usage | SMBS[3] Usage | DADMC Conversion (%) | INTRINSIC Viscosity (DL/G) |
|---|---|---|---|---|
| 10 | 1.0 | 2.5 | 98 | 0.19 |
| 11 | 1.0 | 1.0 | 97 | 0.35 |
| 12 | 1.0 | 0.2 | 96 | 0.85 |
| 13 | 0.5 | 2.2 | 97 | 0.26 |

Notes:
[1] 49% Aqueous Solution
[2] See Table I
[3] See Table I

EXAMPLE 14

The effect of omitting the nitrogen purge to remove dissolved oxygen and exclude ambient oxygen was shown in the following experiment. Two polymerizations were carried out simultaneously which were identical in every respect but for the nitrogen purge. In the first experiment, in which the monomer and catalyst solutions were sparged with nitrogen, and a continuous nitrogen purge maintained, the polymeric product had an intrinsic viscosity of 1.41 dl/g. In the second experiment, in which no sparging or purging was provided, the polymeric product had a significantly lower intrinsic viscosity of 1.28 dl/g.

This example shows that purging of oxygen from the monomer solution is not necessary to prepare a useful polymer in accordance with the present invention. However, the improved appearance and properties obtained when an oxygen purge is employed indicate such step to be a preferred embodiment.

We claim:

1. A process for preparing polymers of dimethyldiallyl ammonium halide while maintaining low unreacted monomer content therein which comprises preparing an aqueous solution containing from about 40 to 70 weight percent of said monomer, effecting polymerization at elevated temperature by incremental addition of an effective amount of a compatible free radical catalyst, and controlling said polymerization to provide a polymer having an intrinsic viscosity in the range of about 0.1 to 1.45 deciliters per gram by the incremental addition of from about 0.01 to 10.0 weight percent of an alkali metal or ammonium bisulfite or the corresponding metabisulfite based on the weight of monomer at a fixed level of said free radical catalyst, during the course of said polymerization.

2. The process of claim 1 wherein purging of oxygen is effected prior to effecting polymerization.

3. The process of claim 1 wherein said monomer is dimethyldiallylammonium chloride.

4. The process of claim 1 wherein said bisulfite is sodium metabisulfite.

5. The process of claim 3 wherein said bisulfite is sodium metabisulfite.

6. The process of claim 1 wherein said bisulfite is added in the amount of about 0.01 to 10.0 weight percent.

7. The process of claim 1 wherein said aqueous solution contains about 45 to 65 weight percent of said monomer.

8. The process of claim 1 wherein said free radical catalyst is ammonium persulfate.

9. The process of claim 1 wherein said elevated temperature is reflux temperature.

* * * * *